US006922487B2

(12) United States Patent
Dance et al.

(10) Patent No.: US 6,922,487 B2
(45) Date of Patent: Jul. 26, 2005

(54) METHOD AND APPARATUS FOR CAPTURING TEXT IMAGES

(75) Inventors: Christopher R. Dance, Cambridge (GB); Guy J. Ruddock, Bedfordshire (GB); William M. Newman, Cambridge (GB); Stuart A. Taylor, Cambridge (GB)

(73) Assignee: Xerox Corporation, Stamford, CT (US)

( * ) Notice: Subject to any disclaimer, the term of this patent is extended or adjusted under 35 U.S.C. 154(b) by 683 days.

(21) Appl. No.: 09/985,433

(22) Filed: Nov. 2, 2001

(65) Prior Publication Data

US 2003/0086615 A1 May 8, 2003

(51) Int. Cl.[7] .............................. G06K 9/20; G06K 9/46
(52) U.S. Cl. ...................... 382/190; 382/245; 382/286; 382/317; 382/319
(58) Field of Search ................................ 382/286, 298, 382/245, 206, 312, 318, 319, 321, 190, 168, 317

(56) References Cited

U.S. PATENT DOCUMENTS

| 5,809,168 A | * | 9/1998 | Shinada et al. ............. 382/193 |
| 5,809,183 A | * | 9/1998 | Serizawa et al. ........... 382/301 |
| 5,828,771 A | * | 10/1998 | Bloomberg ................. 382/112 |
| 5,887,086 A | * | 3/1999 | Tokano ....................... 382/312 |
| 6,178,270 B1 | | 1/2001 | Taylor et al. |
| 6,252,984 B1 | * | 6/2001 | Haneda et al. .............. 382/181 |
| 6,473,523 B1 | * | 10/2002 | Newman et al. ............ 382/176 |
| 6,668,101 B2 | * | 12/2003 | Kaneda ....................... 382/301 |
| 6,674,900 B1 | * | 1/2004 | Ma et al. .................... 382/176 |
| 2002/0085758 A1 | * | 7/2002 | Ayshi et al. ................ 382/199 |

OTHER PUBLICATIONS

D. S. Bloomberg et al., Blur Hit–Miss Transform and its use in Document Image Pattern Detection:, in Proceedings Document Recognition II, SPIE vol. 2422, San Jose, Feb. 1995, pp. 278–292.
Philips Vesta Pro Scan PCVC609K, Pagecam 2.1 User Guide, Sep. 2000. Available on the internet at: http://www.pc–cameras.philips.com/manual/english/win/pcvc690k/.
William M. Newman et al., CamWorks: A Video–Based Tool for Efficient Capture from Paper Source Documents:, Proceeding of the International Conference on Multimedia Computing and Systems, vol. 2, pp. 647–653, Jun. 1999.

* cited by examiner

Primary Examiner—Jon Chang
(74) Attorney, Agent, or Firm—Oliff & Berridge, PLC

(57) ABSTRACT

A device and method are described for capturing an image of a document using a digital camera. The invention includes a resolution analyzer for analyzing the resolution of text characters in the image, to assess whether the resolution is suitable for OCR. In one aspect, if the resolution is too small or too large, an indicator is generated to guide the user as to the corrective movement of the camera to improve the resolution for OCR. In a second aspect, an electronic zoom control is controlled to alter the magnification of the captured image, to correct the resolution. In a third aspect, a method is described for analyzing the image to determine the resolution according to the height of text characters in the image. The method includes analyzing the run lengths of pixels in the image to identify a predominant length corresponding to the average character height (in pixels).

19 Claims, 11 Drawing Sheets

FIG. 5A
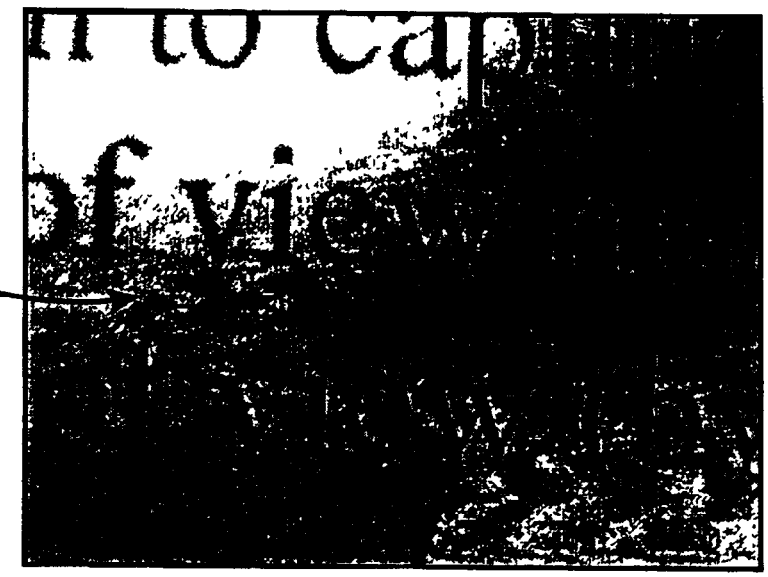
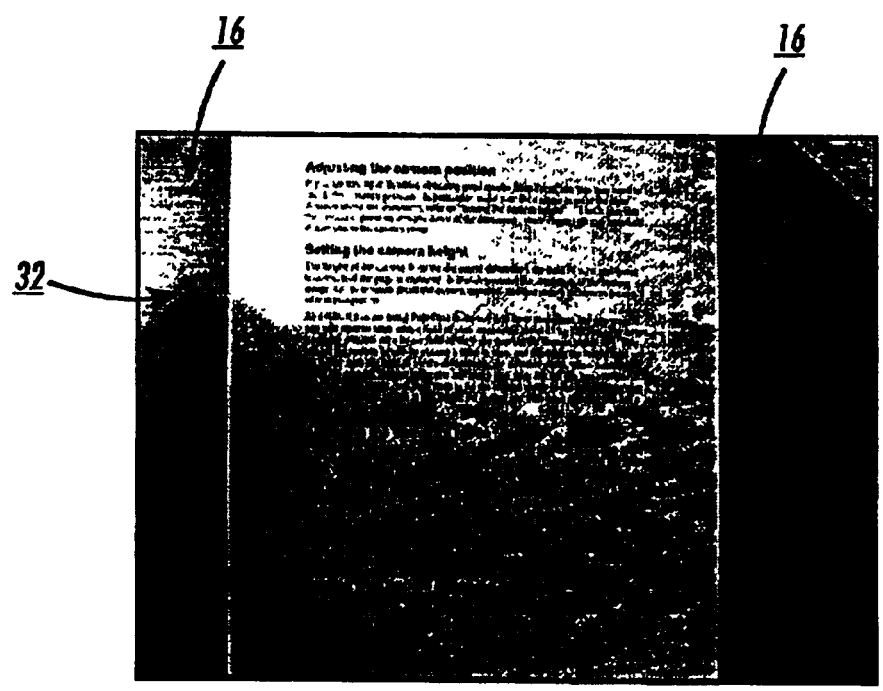
FIG. 5B

METHOD AND APPARATUS FOR CAPTURING TEXT IMAGES

BACKGROUND OF THE INVENTION

1. Field of the Invention

The present invention relates generally to a digital camera, and more particularly, to a system in or usable with the digital camera for assisting the capture of text images. The system may be applied to handheld cameras and to mounted cameras.

2. Description of Related Art

It is well known to use scanners, such as flatbed scanners, to capture and convert bitmap images of documents to text or structured documents. An entire image can either be captured at maximum resolution, or a low-resolution pre-scan can be performed for selection of text regions, followed by a high resolution re-scan of the specified regions. In such a case, the document will always have a fixed optical relation to the scanner, and the resolution of the scanner is such that most documents can be captured with adequate resolution for optical-character-recognition (OCR) processing to convert the image to text.

However, a problem can occur for users of mounted or handheld digital cameras when capturing images of text documents. This is a relatively new area of use of digital cameras, of which not many users have experience. The problem is that the resolution of such cameras tends to be substantially less than that of flatbed scanners, and care is required to ensure that the captured image has sufficient resolution for OCR. There is a significant difference between the minimum resolution (visual resolution) at which a user can read the text in an image of a document, and the minimum resolution (OCR resolution) at which OCR will perform satisfactorily. The minimum OCR resolution is much greater than the minimum visual resolution.

For a camera, the size (or resolution) of the text characters in the image is directly dependent on the distance between the camera and the document being captured. Although experienced users may be able to judge this themselves, this tends to be a severe problem for novice users of the camera. For example, a novice user may be tempted to position the camera at a height at which he can just read the text in the field of view indicator. This would be too small for good OCR results, but the user would not find this out until he came to process the captured images. The image capture will be useless if the captured images cannot be processed for OCR. Moreover, once a user has encountered such a critical problem using a digital camera for the first time (instead of a traditional scanner), it is likely that he will never attempt to use the same system again.

Additionally, even when experienced users of digital cameras are confronted with a document with an extreme font size, they will often waste a lot of time repeatedly repositioning the camera until they achieve satisfactory results.

U.S. Pat. No. 6,473,523, filed May 4, 1999, entitled "Portable Text Capturing Method And Device Therefor", which is incorporated herein by reference, discloses a system in which a handheld camera can provide feedback to the user about the suitability of an image for OCR. However, the suggested feedback is based on limited factors, which might not be directly representative if the text size in all cases. One of the problems is that the user generally requires an indication rapidly (in real time image capture), and so any processing must be performed very quickly. The described technique is to detect the spacing between lines of text. This can be processed relatively quickly, but as mentioned above, might not give an accurate determination of the text size in all cases. Moreover, the described feedback does not provide any guide as to better or corrective action the user should take to improve the image quality.

SUMMARY OF THE INVENTION

In one aspect, it would be desirable to improve the indication provided to a user of a digital camera, of the suitability of an image for OCR.

Broadly speaking, a first aspect of the invention is to provide an indication to the user of whether the resolution (size) of text characters in the image is smaller than a desired minimum for OCR, or whether the resolution is larger than a desired maximum.

Preferably, the indication includes a guide as to the corrective action the user should take to improve the quality of the image for OCR. For example, if the resolution is too small, the indication may be a "down" indicator to indicate that the user should move the camera closer to the document object, to increase the image resolution. Alternatively, if the resolution is too large, the indication may be an "up" indicator to indicate that the user should move the camera further from the document object, to decrease the image resolution.

In a second aspect, it would be desirable to improve operation of the camera, to provide automatic capture at an optimum resolution.

Broadly speaking, the second aspect of the invention is to control an electronic zoom lens of the camera in response to the detected image resolution (or the detected size of text characters in the image). For example, if the resolution is determined to be too small, then a zoom control signal can be generated to control the zoom lens to increase the zoom magnification (equivalent to moving the camera closer to the document). If the resolution is determined to be too large, then the zoom control signal can be generated to control the zoom lens to decrease the zoom magnification (equivalent to moving the camera further from the document).

In a third aspect, it would be desirable to improve the techniques for detecting the suitability of an image for OCR.

Broadly speaking, in accordance with the third aspect, the resolution (size) of text in the image is determined by identifying the heights of text lines in the image (in contrast to the technique of identifying the line spacing as in U.S. patent application Ser. No. 09/304,659).

The text height is calculated by: determining the run lengths of runs of pixels in the image; and analyzing the run lengths to identify a predominant length corresponding to the average character height (in pixels).

Preferably, the method is repeated for each of two axes of the image, the axes being determined so as to be parallel to, and perpendicular to, the direction of the lines of text. Such a determination of axes is effective to resolve the image for skew, and any suitable deskewing method may be used.

The above aspects may be used independently. However, additional advantages are achieved by combining two or more in combination.

The above aspects may be implemented within a camera, or by an external system coupled to a camera.

BRIEF DESCRIPTION OF THE DRAWINGS

Embodiments of the invention are now described, by way of example only, with reference to the accompanying drawings, in which:

FIGS. 5(a) and (b) are schematic diagrams showing example captured images at high and low resolutions, respectively;

DETAILED DESCRIPTION

Figure 1:
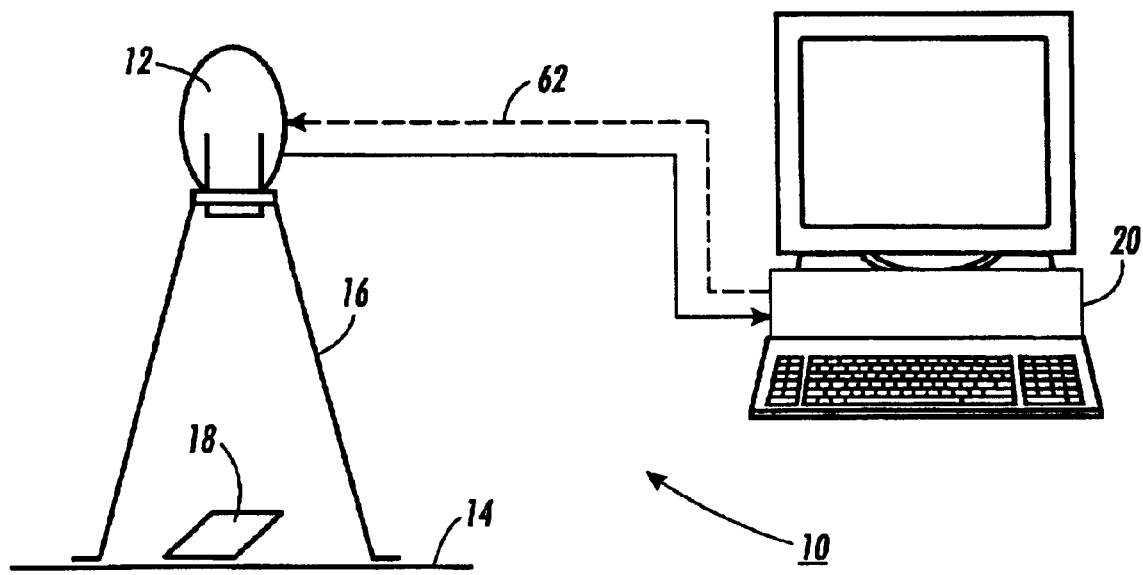
FIG. 1 is a schematic block diagram of the functional components in a first embodiment of a digital camera imaging system for documents.

Referring to FIG. 1, a digital document capture system 10 comprises a digital camera 12 mounted above a surface 14 by means of a stand 16, for viewing a paper document 18 placed on the surface 14. The stand may be free-standing (such as a tripod frame), or it may consist of one or more legs integral with, or coupled to, the case of the camera. In the present embodiment, it is preferred that the height of the stand be adjustable; for example, the legs may be telescopically extendable, although this is not essential if the camera has an adjustable zoom lens.

A suitable digital camera 12 is the Vesta Pro camera made by Philips.

The output of the digital camera 12 is coupled as an input to a computer 20, running an application program for displaying and/or processing the document image captured by the camera 12. A suitable application program is, for example, PageCam produced by Xerox Corporation. However, those skilled in the art will be aware of many other suitable programs for display and processing captured digital document images.

The computer 20 may be a stand-alone computer, or it may be coupled to a network (not shown) for transmitting document images, or converted text documents, to the network. Preferably, the application program includes OCR processing to convert a document image to text characters (or to a structured document). However, it will be appreciated that (in the case of a networked system) such conversion could be performed by another computer, which may be in communication over the network.

One of the problems for users is the setting of the height of the camera 12 relative to the document 18, to ensure that the text in the document image has sufficient resolution for OCR. As explained previously, the minimum resolution for satisfactory OCR is significantly greater than the image resolution readable by the human eye. In other words, the mere fact the image is legible on the computer screen does not mean that it is suitable for OCR. Particularly for inexperienced users, it is difficult to judge the camera distance suitable for a document to ensure reliable OCR, while also capturing as much of the document as possible within the image. It will be appreciated that, generally, it is not possible to perform the OCR instantly or even at a rate as high as the incoming frame rate from the camera 12 (typically about five frames or more per second). Therefore, the OCR has to be performed as a separate operation after image capture.

In the present embodiment, the application program on the computer 20 is modified to assess the suitability of an image for OCR, and to provide feedback to the user about how to modify the camera position (or camera zoom setting) to improve the quality of the image for OCR.

Figure 2:
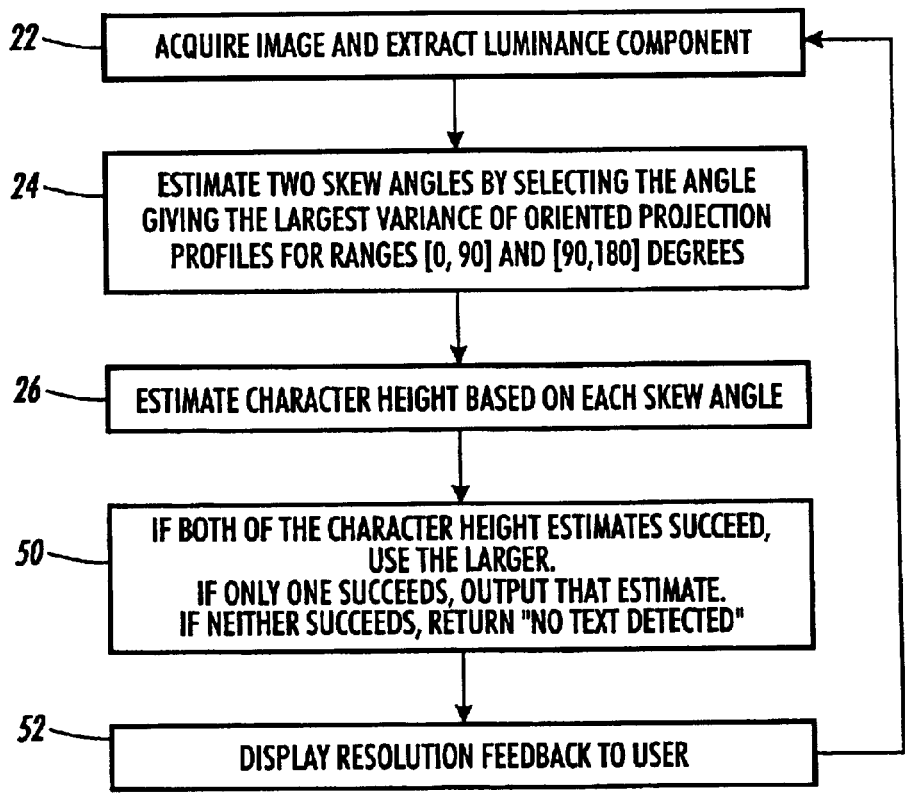
FIG. 2 is a flow diagram showing the process steps for analyzing the suitability of the image for OCR.

FIG. 2 shows the general processing steps required for assessing the suitability of the image for OCR. In general, it should be remembered that the processing is preferably adapted so that it can be carried out quickly, to provide the user with an indication rapidly if the image is not suitable for OCR.

Ideally, the following analysis steps would be best carried out on a binary image (i.e. an image in which pixels are either "on" or "off"). However, it would be very time consuming to convert an input image into a binary image, in view of the potentially huge variation in resolution and blur in an input image. Therefore, the processing is carried out instead on a gray-scale (luminance) profile. Accordingly, a first step 22 in FIG. 2 is to extract the gray-scale (luminance) component of the input signal, and to store this in a region of buffer memory.

At step 24, the image is resolved for skew. Generally, the user will not have aligned the document perfectly with the horizontal and vertical axes of the field of view of the camera (i.e. with the axes of the image "window"). In some cases, the lines of text may also be slightly inclined on the document. Therefore, for either reason, the second step 24 is preferably carried out to identify the skew angle, so that the text lines can be analyzed in a predictable manner.

Various skew detection/correction algorithms are know to those skilled in the art, for example, see for example U.S. Pat. No. 6,178,270, the contents of which are incorporated herein by reference, and the above incorporated U.S. patent application Ser. No. 09/304,659. The present embodiment uses a variance-maximization technique, based on the extracted gray-scale profiles.

Figure 3:
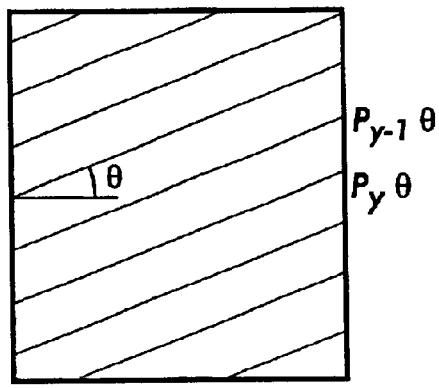
FIG. 3 is a schematic diagram illustrating the calculation of skew in the image.

Referring to FIG. 3, the variance between adjacent scan-lines is calculated for different angles of inclination θ of the scan-lines. The calculation may either be performed by rotating the image in the memory, or by mathematically addressing the memory along lines at the angle θ. If the deskewing technique is carried out merely for the purpose of the determining the suitability of the image for OCR, then a high accuracy of θ is generally not required, and so it is preferred to increment θ by increments of at least 1°, more preferably about 3°. The larger the increment, then the less repeated calculation that needs to be carried out, and the quicker the de-skewing process.

For many documents, there is a 90° ambiguity in the skew angle (due to text layout in blocks or in columns, etc.). Therefore, at step 24 two distinct peaks in the variance are selected at roughly 90° to each other, and subsequent processing is repeated for both of these candidate angles.

At step 26, a routine is carried out to estimate the height of characters (in pixels). The principle is to determine the character heights by statistically analyzing the "run-lengths" in the values of adjacent pixels in each of the perpendicular scan-line directions determined in step 24. Characters of the same height, and including a vertical stroke will tend to produce a prominent stroke length, i.e. a run of adjacent pixels of a similar value (below, or above, a certain gray-scale threshold value, or differing by less than a certain gray-scale threshold value). Since the two scan directions determined in step 24 are perpendicular, one will correspond to the horizontal direction of the text, and the other will correspond to the vertical direction (in which the vertical stroke length can be detected).

Figure 4:
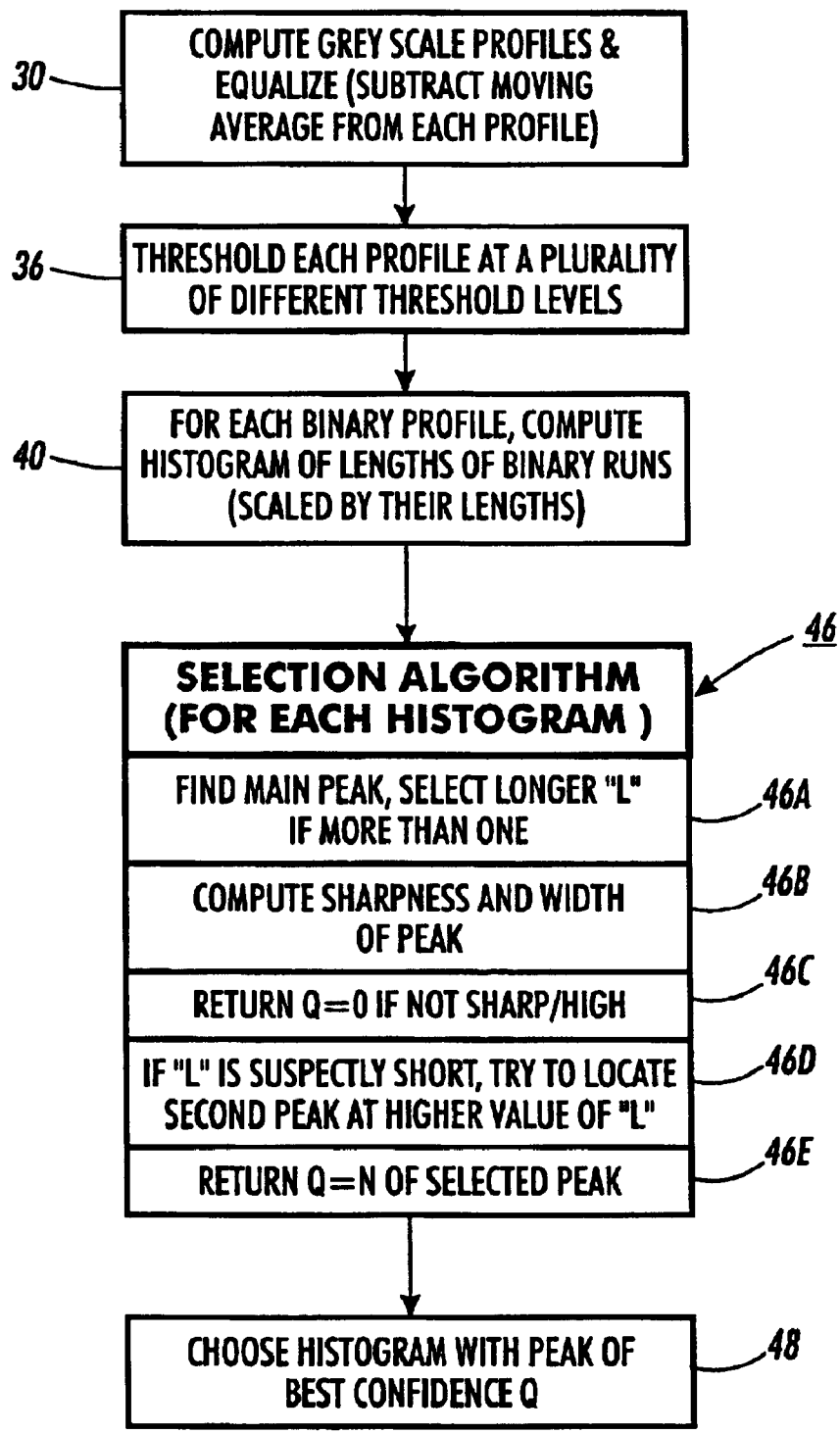
FIG. 4 is a flow diagram showing the detailed process steps for determining the height of text characters in the image.
Figure 6A:
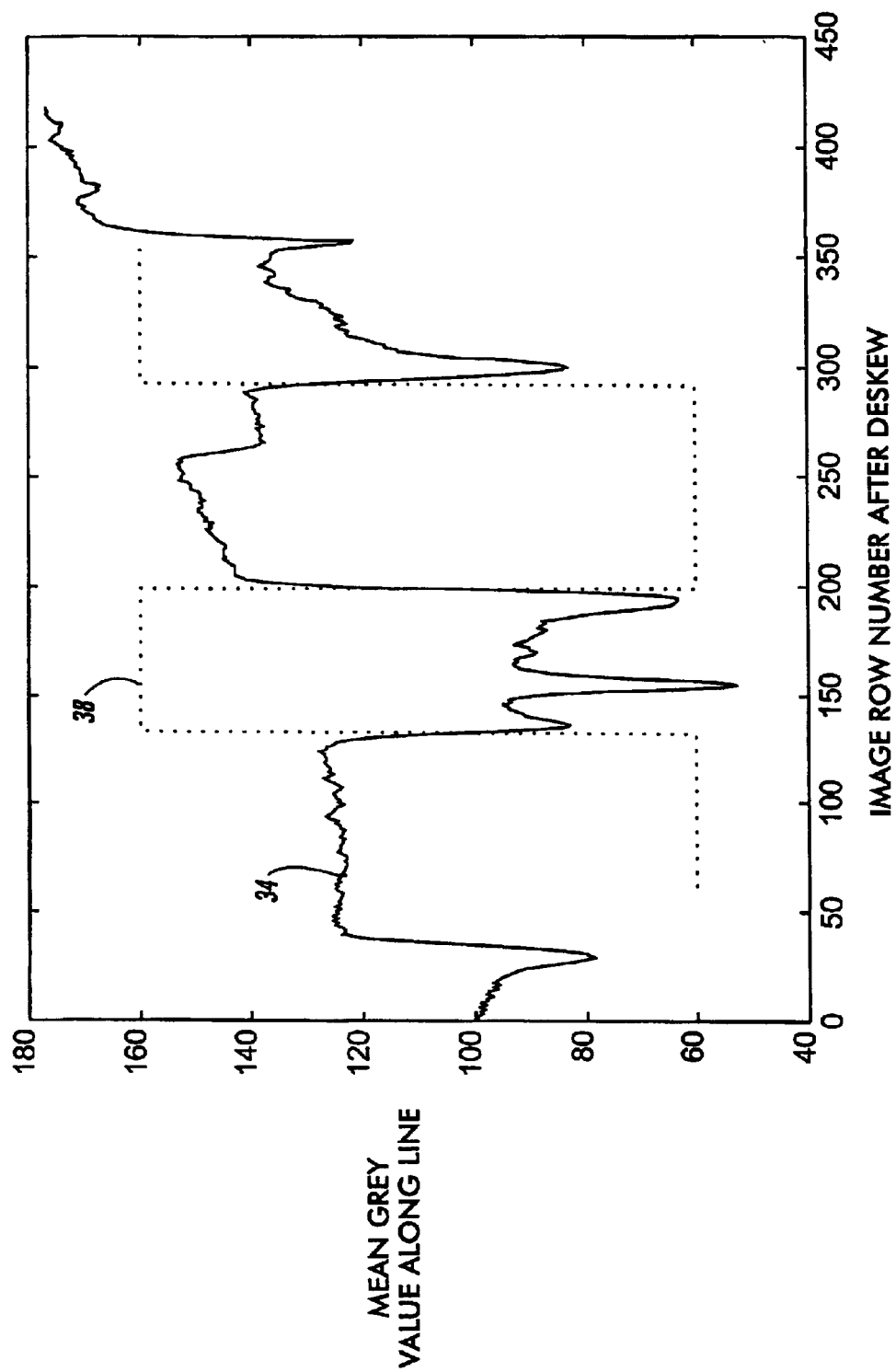
FIGS. 6(a) and (b) are schematic diagrams showing a gray-scale profile taken in a vertical direction through the image of FIGS. 5(a) and (b) respectively (continuous line is the gray-scale profile; broken line is a thresholded profile after equalizing and thresholding)
Figure 6B:
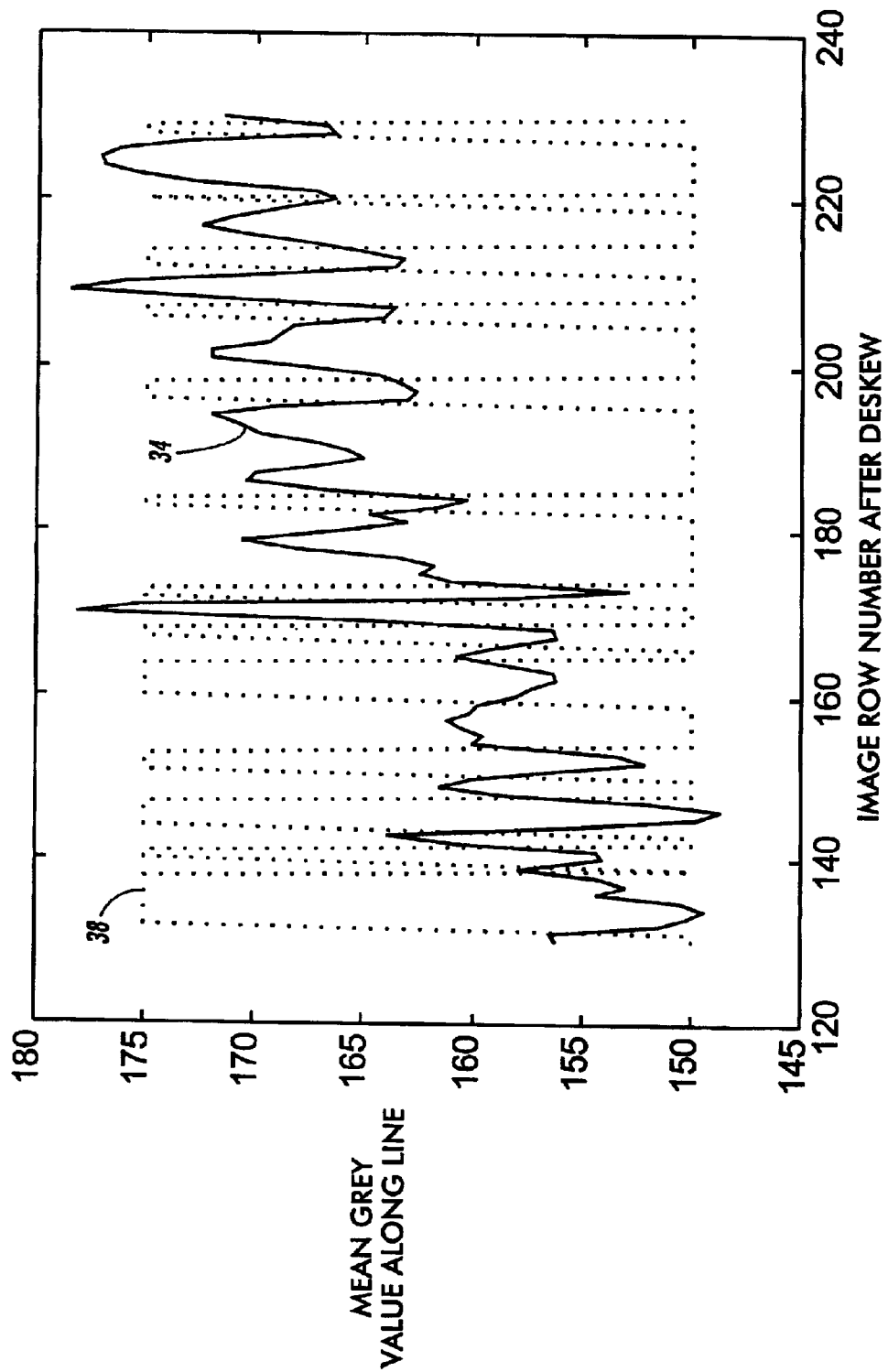

The processing in step 26 is additionally refined, as will be apparent from the following description, with reference to FIGS. 4–7. FIG. 4 shows the steps of the height estimation routine; FIGS. 5(a) and (b) show sample relative high and relatively low resolution images; FIGS. 6 and 7 show examples of the statistical analysis of the image processing.

Referring to FIG. 4, a first step 30 is to equalize the gray-scale profiles in the image for different lighting conditions (e.g. shadows), and different colors of objects captured within the image. For example, both FIGS. 5(a) and 5(b) include regions of shadow 32. In FIGS. 6(a) and (b), the solid line 34 represents the gray-scale profile in a vertical direction in the corresponding image in FIG. 5. It can be seen that the average gray scale intensity 34 generally increases from left to right in FIG. 6, corresponding from top to bottom in FIG. 5, due to the lighting conditions.

Additionally, the image in FIG. 5(b) includes a portion of the desktop surface 14 on which the document 18 is resting, which further complicates the gray-scale profile.

To equalize the image, the image is divided into segments which are processed to de-emphasize background effects. In this embodiment, the image is divided into strips perpendicular to the scan direction, i.e. in rows and columns. The width of each segment is typically about 60 pixels, although this can vary in other embodiments. A local average of the pixel value (over a 121 pixel width) is calculated and is subtracted from the pixels in the segment. The local average value will vary according to variation in the local tones and shades, to de-emphasize the unwanted "background" effects, and thereby emphasize the more important foreground text "detail".

At step 36, the gray-scale profiles are thresholded to binarize the gray-scale profiles, to distinguish the pixels of the characters from the background. This can either be done by comparing the pixel values to an absolute threshold value, or by detecting changes in the pixel values above a certain delta-threshold. In order to be fully versatile, in this embodiment, the process is repeated for several different thresholds, and the results from each threshold are processed to determine which provides the most reliable result (according to a confidence or quality factor Q explained in more detail below).

In the case of the Philips Vesta Pro camera, which generates an 8-bit gray-scale output, four different delta-threshold values are used (preferably 2, 3, 5 and 8 gray-levels). It will be appreciated that a low delta-threshold value is more "sensitive" for detecting faint text colors, but is also more prone to noise. A higher delta-threshold value is less prone to noise, but might not detect faint text detail reliably.

It will be appreciated that the threshold values used in this embodiment for thresholding a profile, are relatively small, compared to the contrast between foreground and background gray-levels in the original image (which is typically a contrast of at least 50 gray-values). This is because a value from a profile is an average of the gray-values along a line through the image. Such a line typically contains more background points than foreground points even if it goes through the middle of a text line. Therefore, the difference between profiles through text lines, and profiles through white-space, is generally much less then the difference between foreground and background gray-levels, thus requiring the threshold values to be smaller to differentiate two such profiles.

In FIGS. 6(a) and (b), a "typical" thresholded profile is represented by the broken line 38. A high section represents "dark" text pixels, and a low section represents "light" paper background pixels. (For the sake of clarity only one thresholded profile is shown, although it will be appreciated that the several different threshold values used will each produce its own profile shape).

Figure 7A:
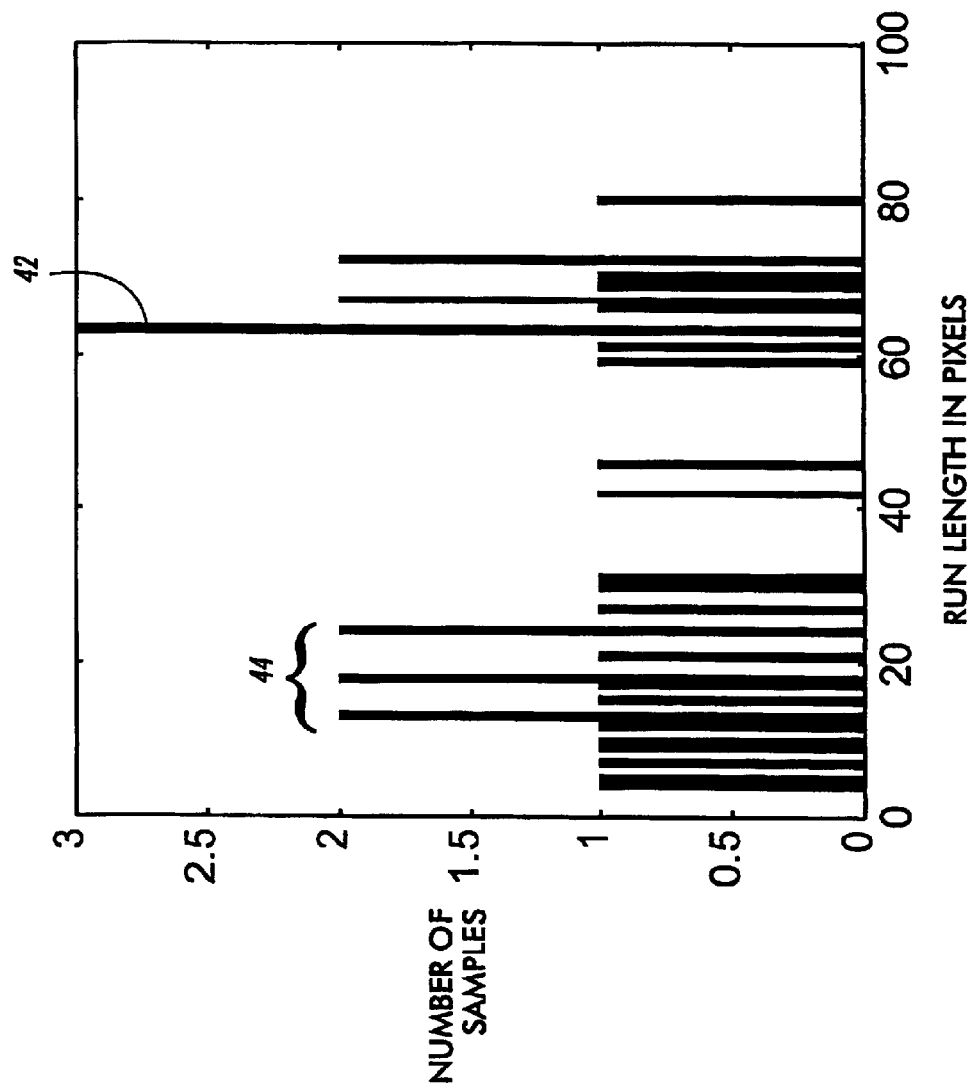
FIGS. 7(a) and (b) are schematic histograms for the thresholded profiles of FIGS. 6(a) and (b)

At step 40, the thresholded profiles are processed into a run-length histogram. Each "bin" in the histogram (horizontal axis) represents a run-length of similar pixels. The vertical axis represents the number of "runs" having that run-length. FIGS. 7(a) and (b) illustrate the run-length histograms for the respective thresholded profiles in FIGS. 6(a) and (b).

It will be appreciated that steps 36 and 40 may be combined into a single step, but they are described here separately for the sake of explanation.

The run-length histograms contain peaks which represent the frequently occurring "runs" of adjacent pixels in the images, corresponding to characteristic "stroke" lengths in the characters, as explained above. If desired, a characteristic character height may be determined simply by selecting the highest value. For example, in FIG. 7(b), there is a clear peak value 42, which does correspond to the mean character height. (It will be appreciated that such a high peak would not occur in the histogram for the horizontal direction).

Figure 7B:
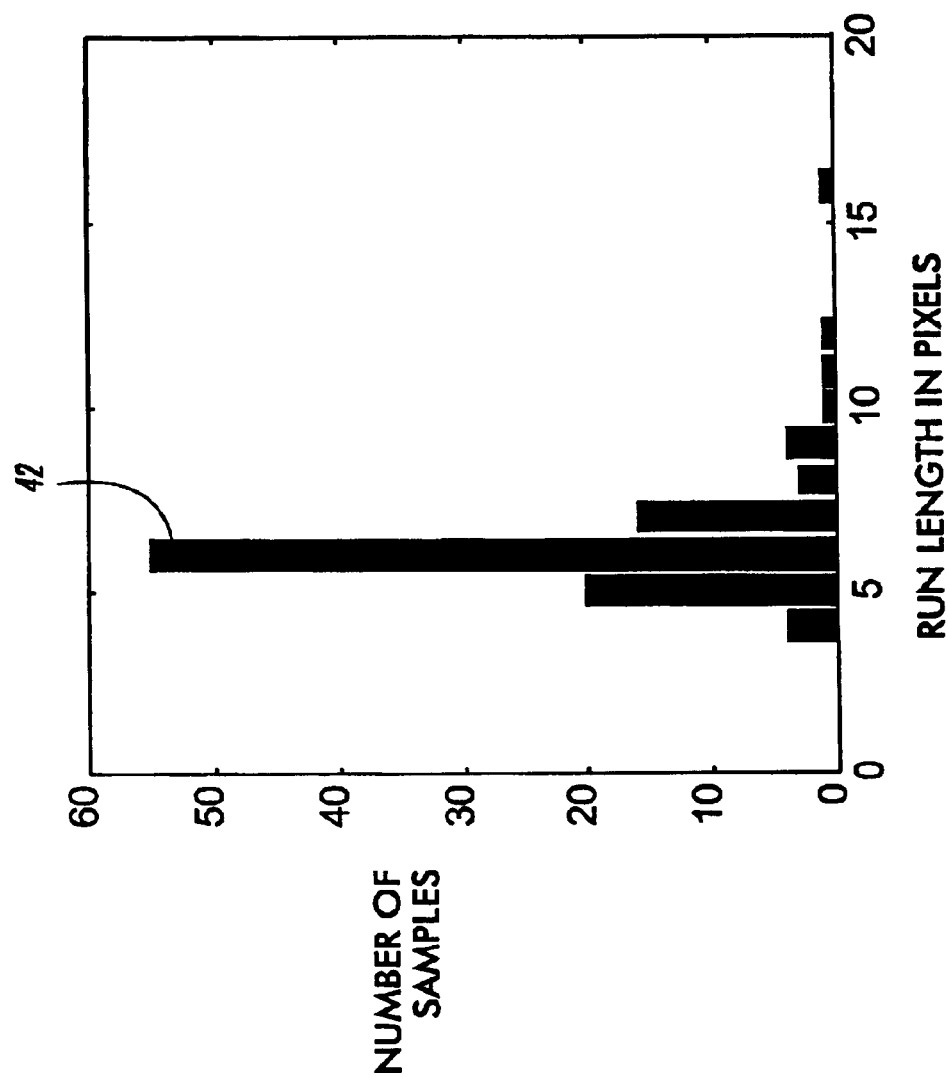

However, although not apparent in FIG. 7(b), there are several factors which may confuse the histogram, and the selection of the appropriate peak:

(a) The peaks from the different histograms for different threshold values might not correspond. Therefore, a selection needs to be made of which peak to use as the "best" peak.

(b) A peak in the run-length histogram does not always correspond to the character height. When text is scanned at high resolution relative to its font size (FIG. 5(a)), a sort of "resonance" phenomenon is observed in the histogram (FIG. 7(a)). It is common to see one or more peaks 44 in the histogram for short run-lengths that correspond to the width of individual strokes, as well as a peak 42 for long run-lengths that corresponds to the height of the characters. The short run-length peak(s) 44 may often be larger than the long run-length peak 42 (although in FIG. 7(a) it is just lower, due to sparseness of the histogram). A selection needs to be made of which peak to use.

(c) Given two images of the same size in pixels, one of high resolution (FIG. 5(a)), and one of low resolution (FIG. 5(b)), it is expected that there will be more text lines in the low resolution image, leading to higher peaks. For the low resolution image, the number of text lines is smaller, leading to generally lower peaks.

In the present embodiment, these issues are addressed by a selection algorithm (step 46 in FIG. 4) for selecting a peak based on a confidence or quality factor Q for the peak. The Q factor is calculated for each histogram as follows:

Step 46a: Identify n(L) being the number of runs observed of length L, which is the maximum n in the histogram (i.e. choose the maximum peak). When several different lengths L achieve this maximum (or achieve a similar maximum within a limited range), then choose the larger or largest value of L. This takes in to account that run-lengths caused by noise or by character-widths tend to be short (i.e. small L), whereas the run length corresponding to the character height is relatively long (i.e. large L).

Step 46b: Determine a value w being the half-range of the histogram peak: that is, the distance between the closest point to the left and to the right of the peak for which a number of runs less than or equal to n/2 are observed. Let a be a parameter that increases with the amount of runs due to noise in the histogram (parameter a is consider to have a unit of length in pixels).

Step 46c: If the peak is not:

sufficiently high (for some threshold $t_{high}$): $n > t_{high}(a+L)$ and sufficiently sharp (for some threshold $t_{wide}$): $w < t_{wide}/(a+L)$ then return Q=0 (confidence is zero for this histogram peak).

Step 46d: To identify short resonance peaks, then if L is shorter than some threshold $L_{short}$: $L < L_{short}$ (e.g. the peaks 44 in FIG. 7(a)), then try to identify another peak for a longer length, at least kL, for some parameter k>1 (e.g. the peak 42 in FIG. 7(a)).

If this longer peak is sufficiently high and sufficiently sharp (i.e. satisfies the tests of step 46c), then use this longer peak. Otherwise, use the previously selected peak.

Step 46e: Return the confidence factor Q=n, the height (population) of the selected peak.

Preferred values for the parameters in the above steps are: a=2.0; $t_{high}$=74; $t_{wide}$=0.55; $L_{short}$=6; and k=3.5. However, it will be appreciated that the parameters may vary for other embodiments.

At step 48, the histogram having the highest Q factor is chosen. The value L for this peak represents the character height in pixels. It will be appreciated that the four different threshold values create four different histograms each having its own Q factor, and the 90° ambiguity in the skew causes the processing to be repeated in both the horizontal and vertical directions, resulting in a total of 8 different histograms.

At step 50 (FIG. 2), a test is carried out to determine the ratio of the determined character height L to an ideal character height for OCR, $L_{ideal}$, chosen to give a reasonable trade-off between OCR rate and the amount of text that may be fitted within the field of view of the camera. For the Philips Vesta Pro camera, $L_{ideal}$ is preferably 9 pixels. At step 52, feedback is generated to the user, for example by the generation of an information icon in the computer's display.

Figure 8:
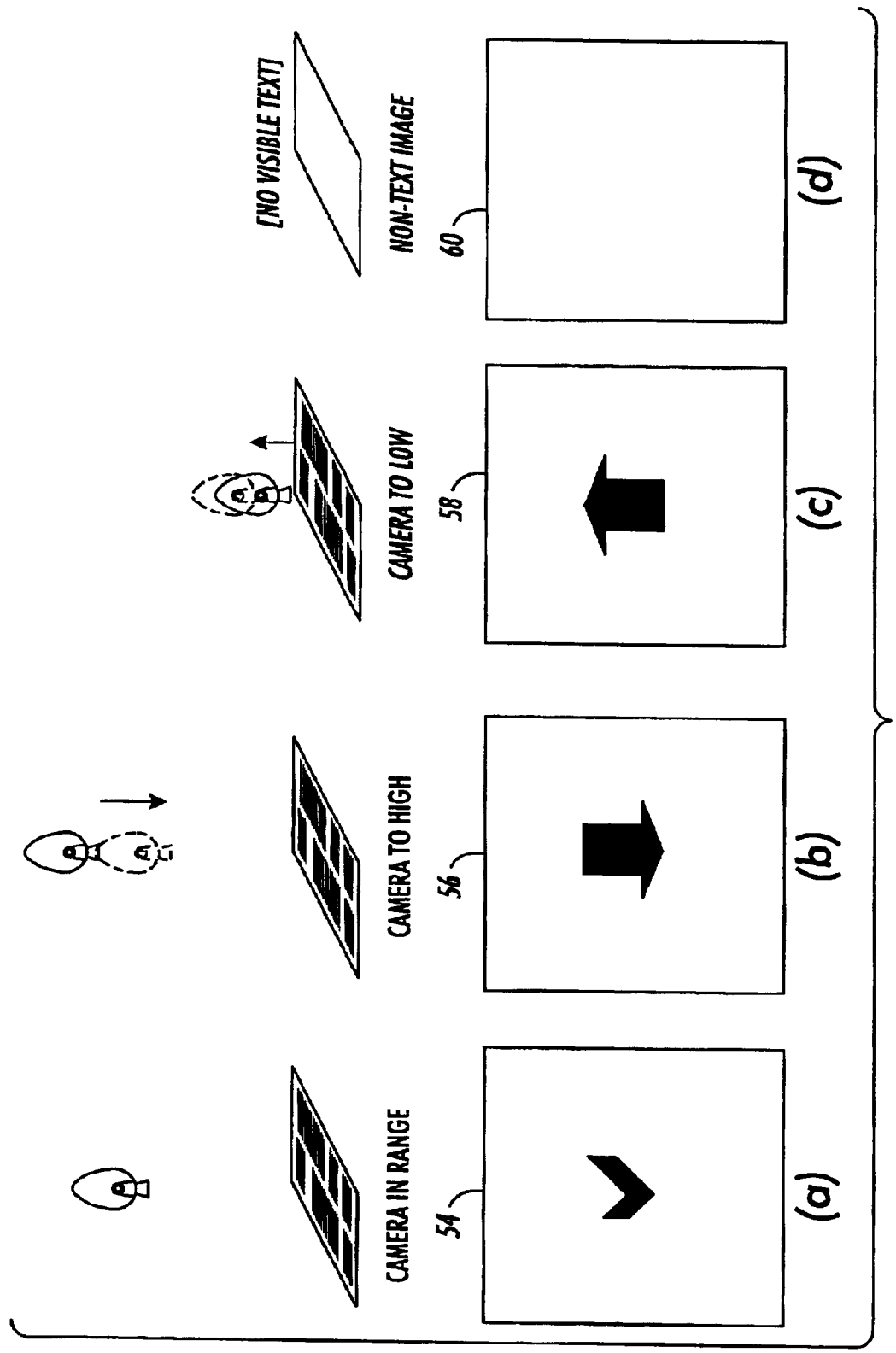
FIGS. 8(a)–(d) are schematic illustrations of the display icons for correcting the position of the camera.

Referring to FIG. 8(a), when the ratio is about 1, the camera is positioned at the appropriate height. An "OK" icon 54 is displayed.

Referring to FIG. 8(b), when the ratio is less than 1, this means that the character height is too small, so the user is prompted to move the camera down (or closer to the document 18) by the generation of a "down" icon 56. If the camera has a manually variable zoom setting, then the user may alternatively increase the amount of zoom to achieve the same effect.

Referring to FIG. 8(c), the present embodiment also provides an indication if the character size is too large, in which case the ratio will be greater than a maximum value $r_{max}$. This maximum value is selected to correspond to a point where either sufficient focus of the camera is near impossible, or where the size of characters would violate assumptions made by subsequent binarization or OCR algorithms. For the Philips Vesta Pro camera, $r_{max}$ is preferably about 6, corresponding to the camera being 12 cm/2 cm from 10 pt Times new Roman text and scanning resolutions of 140 dpi/840 dpi. If the ratio exceeds $r_{max}$, then the user is prompted to move the camera up (or further from the document 18) by the generation of an "up" icon 58. Again, if the camera has a manually variable zoom setting, then the user may alternatively reduce the amount of zoom to achieve this distancing.

Referring to FIG. 8(d), if the text height determination algorithm has failed, i.e. all of the histograms have returned a confidence factor of zero, then a blank icon (or a failed icon) 60 is displayed. This may occur if, for example, the document is not a text document.

As a modification of the above embodiment, step 52 may additionally generate a control output (output 62 shown in phantom in FIG. 1) for controlling a zoom mechanism of the camera, if the camera has a variable zoom, which can be controlled electronically. This would enable automatic "hands-free" operation of the zoom setting to ensure that documents are scanned at a sensible resolution without the user having to control the camera.

The techniques described above are advantageous in being able to provide reliable results rapidly. When running on a 600 MHz computer 20, the technique can accommodate about 5 frames per second, which is sufficient to keep up with the incoming video frame rate. Moreover, the techniques are versatile and robust in being applicable to a wide range of documents, without making severely limiting assumptions about the text or text layout.

In the above embodiment, the processing to determine OCR suitability is performed in a computer 20 to which the camera 12 is coupled. In a second embodiment, the processing is carried out in the camera itself, to provide a more versatile arrangement for portable hand-held cameras.

Figure 9:
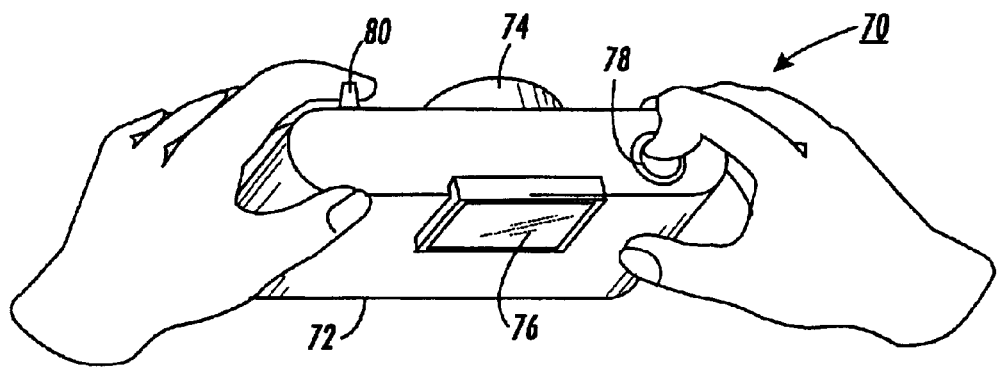
FIG. 9 is a perspective view of a second embodiment of digital camera.
Figure 10:
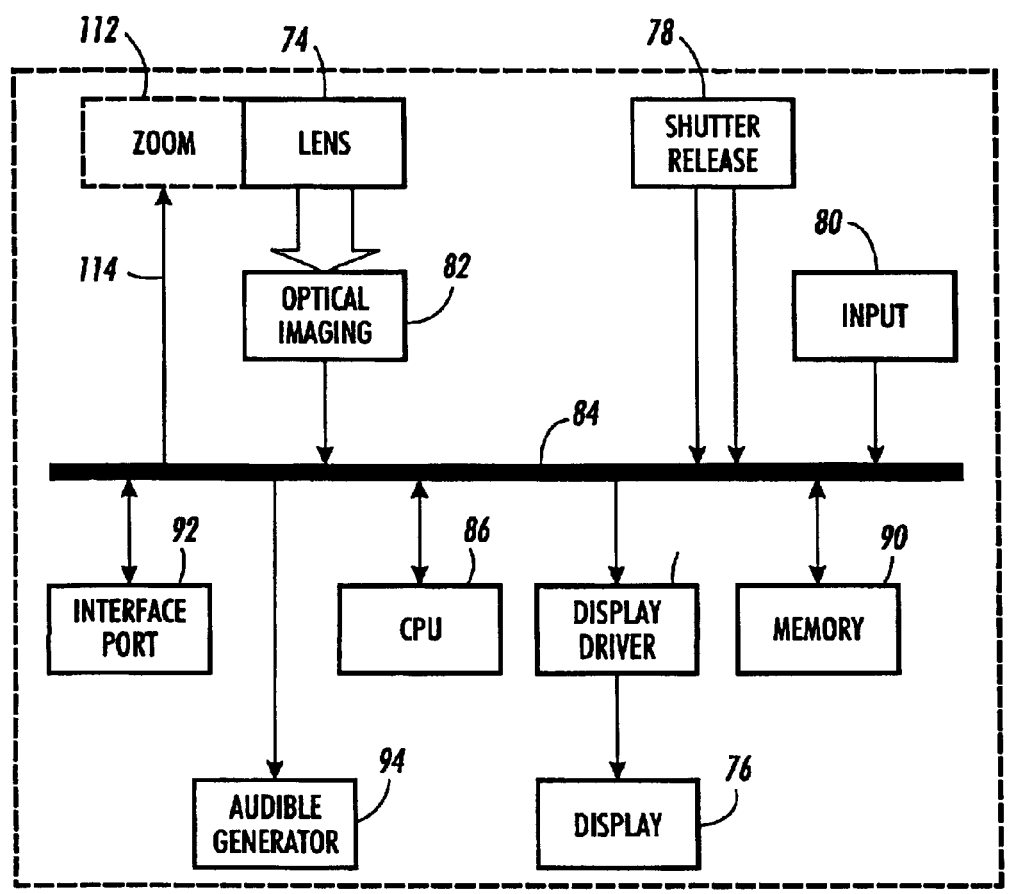
FIG. 10 is a block diagram of functional components of the camera of FIG. 9.
Figure 11:
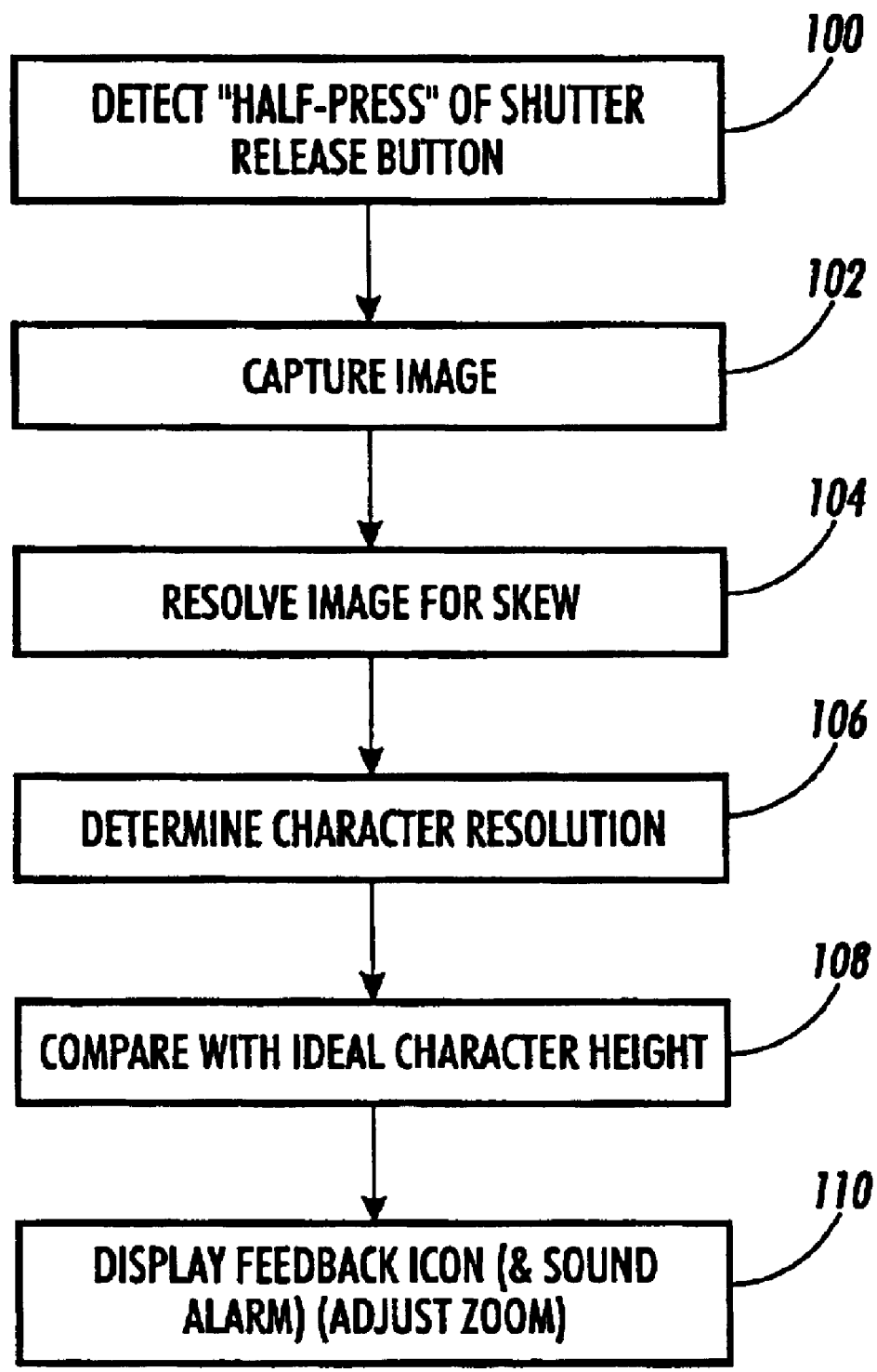
FIG. 11 is a flow diagram showing the processing steps for processing an image to determine its suitability for OCR.

Referring to FIGS. 9–11, a digital camera 70 comprises a case 72 on which are mounted an objective lens 74, an electronic display 76 (such as an LCD display), a shutter release switch 78, and one or more other manually operable control buttons 80. The case 72 houses a photoelectric imaging device 82 (such as a CCD) for capturing digital images, and which communicates with other internal circuitry via an information bus 84.

The internal circuitry also includes a processor 86 (which may be a microprocessor or a microcontroller), a display driver 88 for driving the display 76, and a memory 90. The memory may include one or more of semiconductor memory, optical memory and magnetic memory. The bus 84 is also coupled to an interface port 92 through which data can be uploaded from the camera, or downloaded into, the camera, and to an audible alarm generator 94 for generating alarms to alert a user to one or more alarm conditions.

In use, operation of the camera is controlled by the processor 86, which detects user inputs via the shutter release switch 78 and the other controls 80, and directly controls the capture of a digital image through the imaging device 82, and the storage of the captured image in the memory 90. The processor 86 also controls the display driver 88 for generating images on the display 76. Generally, the display driver 88 can be controlled to display an image obtained from the imaging device 82 (e.g. in a real-time viewfinder mode), or to display previously captured images stored in the memory 90. The processor 86 also controls any information messages on the display 76, such as the amount of free memory, or a state of auto-focus. Additionally, the processor 84 controls the generation of the audible alarm generator 94, for example for generating alarm tone if the camera is not focused.

The processor 86 also performs certain image processing operations on the captured images, and may also control operation of the interface port 92.

In a similar manner to the first embodiment, one of the operations carried out by the processor 86 is to determine whether a current image (e.g. an image about to be captured) is suitable for subsequent OCR.

FIG. 11 shows the general processing steps required for assessing the suitability of the image for OCR. The process is initiated at step 100 when the processor detects that the user has partially pressed the shutter release button 78 to a "half-pressed position". (In FIG. 9, the shutter release button 78 has two outputs, one corresponding to depression to a "half-press" position, and the other corresponding to full depression of the button). At step 102, an image is captured using the imaging device 82, and is stored (at least temporarily) in the memory 30.

At steps 104 and 106, processing is carried out in the same manner as that of the first embodiment (and so is not described again in detail). In particular, the image is processed to resolve skew (step 104) and to identify the character height (step 106) on the basis of a most common run-length in a certain direction of the image.

At step 108, the determined character height is compared with an ideal height, to calculate a ratio of the actual/ideal heights (in the same manner as step 50 of the first embodiment). At step 110, a feedback icon is displayed to show the camera user whether or not the image is suitable for OCR, or whether adjustment of the camera is needed. The feedback icons are the same as those described above in FIGS. 8(a)–(d).

Additionally, if the image resolution is too small (FIG. 8(b)), or too large (FIG. 8(c)), or optionally if no determination is possible (FIG. 8(d)), then an alarm tone can be generated through the audible alarm device 94 to alert the user.

In a modified form of the above embodiment, the camera includes an electrically controlled zoom lens (denoted by 112 in FIG. 10). At step 110, a control output 114 is generated from the processor to the zoom lens 112, to adjust the zoom setting if the image is determined to be too small or too large for optimum OCR (in the same manner as the control output 62 in FIG. 1).

Although the profiles-based method described previously (for determining the resolution of text in the image) is currently preferred, it will be appreciated that other embodiments may use different methods within the scope of the present invention. The following alternatives are described for the sake of completeness. The detailed steps for implementing such alternative methods will be apparent to those skilled in the art from the description below (taking into account the foregoing detailed description):

Alternative 1

Instead of using profiles, the image may be directly binarized into only black and white pixels. In a similar manner to that of the preferred embodiment, the run lengths of runs of black pixels may be determined and histogrammed. The peaks in the histogram may then be analyzed in a similar manner to that described previously, to approximate the resolution.

Alternative 2

In alternative 1, instead of histogramming the run lengths of black pixels, the binarized image may be processed to locate connected components in the image, and to compute bounding boxes or bounding ellipses around the connected components. The widths, or the lengths of principal axes of the bounding shapes are then computed and histogrammed, and the peaks in the histogram are analyzed as described above.

Alternative 3

The image may be processed to identify one or more predefined shapes in the gray-level image. For example, this may be done by having a predefined dictionary of some gray-level character shapes at various resolutions, fonts, and orientations. Such an approach is practical because it may be necessary only to store the appearances of one or two commonly occurring characters, such as "i" and "e". The matching process can be accomplished, for example, using the "hit-and-miss transform" such as that described in the reference: D. S. Bloomberg and L. Vincent, "Blur Hit-Miss Transform and its use in Document Image Pattern Detection", in Proceedings Document Recognition II, SPIE Vol. 2422, San Jose, February 1995, pp. 278–292.

This method could also be applied to a binary image, for example, if the image is binarized into black and white pixels.

The resolution is determined by identifying the most common matching resolution.

Alternative 4

As in the preferred method, gray-scale profiles are computed in the image. However, instead of binarizing the profiles to determine segments that correspond to text lines, an alternative characteristic may be determined. For example, the distance may be computed between the closest neighboring pairs of points where the gradient of the profile exceeds some threshold. It will be appreciated that other characteristics will be apparent to those skilled in the art.

It will be appreciated that the foregoing description is merely illustrative of preferred forms of the invention, and that many equivalents and modifications will occur to those skilled in the art without departing from the scope and spirit of the invention. Accordingly, the appended claims are intended to be broadly construed.

What is claimed is:

1. An apparatus for capturing an image of a document, comprising:

an image capture device for capturing a digital image of a document in a field of view of the image capture device;

a resolution analyzer for analyzing the image to determine an approximate resolution of text characters in the image;

a comparison device responsive to the determined resolution of text characters, for comparing the determined resolution with predetermined data representing a maximum desired image resolution and a minimum desired image resolution;

an output device for generating a first output to indicate to the user a condition that the resolution is less than the desired minimum resolution, and a second output to indicate to the user a condition that the resolution is greater than the desired maximum resolution.

2. An apparatus according to claim 1, wherein the first and second outputs are different visual outputs.

3. An apparatus according to claim 2, wherein the first output is an indicator to indicate that the camera should be moved closer to the document object to increase the resolution of the image, and the second output is an indicator to indicate that the camera should be moved away from the document object to reduce the resolution of the image.

4. An apparatus according to claim 2, wherein the first indicator includes a "down arrow" symbol, and the second indicator includes an "up arrow" symbol.

5. An apparatus according to claim 2, wherein the first output is an indicator to indicate that the zoom of the camera should be increased to increase the resolution of the image, and the second output is an indicator to indicate that the zoom of the camera should be decreased to reduce the resolution of the image.

6. An apparatus according to claim 1, wherein the resolution analyzer comprises a device for analyzing the image to determine the height of text characters in the image.

7. An apparatus according to claim 6, wherein the resolution analyzer comprises a device for identifying a prominent stroke length in the image, by statistically analyzing the lengths of runs of similar pixel values in the image.

8. An apparatus according to claim 1, wherein the image capture device comprises a digital camera contained in a camera body, and wherein the resolution analyzer, the comparison device, and the output device are implemented in the camera body.

9. An apparatus according to claim 1, wherein the image capture device comprises a digital camera coupled to external electronic processing apparatus, and wherein the resolution analyzer, the comparison device and the output device are implemented in said external processing apparatus.

10. An apparatus for capturing an image of a document, comprising:
   an image capture device for capturing a digital image of a document in a field of view of the image capture device;
   a variable zoom lens system for adjusting the optical image formed at the image capture device, the variable zoom lens system being responsive to an electronic zoom control signal,
   a resolution analyzer for analyzing the image to determine an approximate resolution of text characters in the image;
   a comparison device responsive to the determined resolution of text characters, for comparing the determined resolution with predetermined data representing a minimum threshold resolution and a maximum threshold resolution, and for generating an error output if the determined resolution does not meet the minimum or maximum threshold requirement; and
   a zoom control device for generating said zoom control signal, in response to said error output, to adjust the magnitude of zoom of said field of view, to correct the image resolution.

11. An apparatus according to claim 10, wherein the resolution analyzer comprises a device for analyzing the image to determine the height of text characters in the image.

12. An apparatus according to claim 11, wherein the resolution analyzer comprises a device for identifying a prominent stroke length in the image, by statistically analyzing the lengths of runs of similar pixel values in the image.

13. An apparatus according to claim 10, wherein the image capture device comprises a digital camera contained in a camera body, and wherein the resolution analyzer, the comparison device, and the zoom control device are implemented in the camera body.

14. An apparatus according to claim 10, wherein the image capture device comprises a digital camera coupled to external electronic processing apparatus, and wherein the resolution analyzer, the comparison device and the zoom control device are implemented in said external processing apparatus.

15. A method of determining the resolution of text characters in a digital image of a document, the method comprising:
   determining run lengths of runs of pixels in the digital image; and
   analyzing the run lengths to identify a predominant length corresponding to the average character height by identifying at least one peak in a run-length histogram, wherein the magnitude of the peak represents a pseudo probability factor that the peak corresponds to the predominant character height.

16. A method according to claim 15, further comprising determining at least one axis of the image corresponding to at least one of the direction of lines of text and a direction generally perpendicular to the direction of the lines of text.

17. A method according to claim 16, wherein the step of determining at least one axis comprises determining two axes, being respectively parallel to the direction of lines of text and perpendicular to the direction of lines of text, and repeating the steps of determining and analyzing run lengths for each axis.

18. A method according to claim 15, further comprising selecting a peak representing a longer run length as representing the predominant character height, in the case of two candidate peaks at different run lengths.

19. A method according to claim 15, wherein the image includes a gray-scale component, and wherein the method comprises binarizing the gray-scale component according to a threshold, prior to the step of determining said run lengths.

* * * * *